United States Patent
Fellows (10) Patent No.: US 9,231,261 B2
(45) Date of Patent: Jan. 5, 2016

(54) SYSTEM AND METHOD FOR MINIMIZING FUEL CELL DEGRADATION AFTER SHUTDOWN

(75) Inventor: Richard Fellows, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 557 days.

(21) Appl. No.: 13/484,532

(22) Filed: May 31, 2012

(65) Prior Publication Data

US 2013/0323616 A1    Dec. 5, 2013

(51) Int. Cl.
*H01M 8/04* (2006.01)
*H01M 8/10* (2006.01)

(52) U.S. Cl.
CPC ...... *H01M 8/04223* (2013.01); *H01M 8/04111* (2013.01); *H01M 8/04761* (2013.01); *H01M 8/04955* (2013.01); *H01M 8/0488* (2013.01); *H01M 8/04141* (2013.01); *H01M 8/04231* (2013.01); *H01M 8/04753* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| 7,374,833 | B2 | 5/2008 | Stute |
| 2002/0182456 | A1 | 12/2002 | Condit et al. |
| 2011/0143241 | A1* | 6/2011 | Tighe et al. ............ 429/428 |

* cited by examiner

*Primary Examiner* — Jonathan Crepeau
(74) *Attorney, Agent, or Firm* — Patent Central LLC; Stephan A. Pendorf (57) ABSTRACT

A system and method is provided for minimizing the degradation of a fuel cell after shutdown by forcing remaining air out of a fuel cell system. Upon fuel cell shutdown, the flow of air to the cathode of the fuel cell can be kept at a low rate. The flow of cathode exhaust gases along an exhaust conduit is substantially restricted while the pressure of the supply air supplied is increased. As a result, the pressure of the cathode exhaust gases in the exhaust conduit increases. The voltage of the fuel cell can be to deplete the oxygen in the supply air. The pressure of the supply air is decreased to a pressure lower than the pressure of the cathode exhaust gas in the exhaust conduit such that the cathode exhaust gas flows backward through the system to push out any remaining air.

10 Claims, 7 Drawing Sheets

SYSTEM AND METHOD FOR MINIMIZING FUEL CELL DEGRADATION AFTER SHUTDOWN

FIELD

Embodiments relate in general to fuel cell systems and, more particularly, to minimizing the retention and/or infiltration of oxidizing agents in a fuel cell system after shutdown.

BACKGROUND

Fuels cells produce electricity by converting reactants (e.g., fuel and an oxidizing agent) through electrochemical reactions. In recent times, fuel cells have grown in popularity as an attractive alternative to the internal combustion engine because they generate little or no pollutants. One type of fuel cell is a proton exchange membrane (PEM) fuel cell. PEM fuel cells have an ion exchange membrane, partially comprised of a solid electrolyte, disposed between an anode and a cathode. To produce electricity through an electrochemical reaction, hydrogen is supplied to the anode and air is supplied to the cathode. An electrochemical reaction between the hydrogen and the oxygen in the air produces an electrical current.

When a fuel cell system is shutdown, generation of electrical current by the fuel cell is no longer required. The electrical circuit is opened, thereby relieving the cell of an electrical load. However, upon and during shut-down of the cell, the presence of air on the cathode along with hydrogen fuel remaining on the anode can cause unacceptable anode and cathode potentials, resulting in corrosion in the catalyst and the catalyst assembly support and consequent degradation of the fuel cell and its performance.

Moreover, even after the fuel cell system is shutdown, there are still opportunities for air to enter the cathode of the fuel cell, thereby subjecting the fuel cell to harm. As an example, air flow into the fuel cell system can be induced by the wind. Wind can push air into the system inlet and through the deactivated compressor. Ultimately, such air can travel through the system to the cathode, thereby exposing the cathode to an oxidizing agent.

Another way in which air can flow into the fuel cell system after shutdown is buoyancy-driven air flow. Cathode exhaust gas (mainly composed of nitrogen ($N_2$) and little or no oxygen ($O_2$)) remaining in the fuel cell system at shutdown is warmer and lighter than ambient air. Thus, there is a general tendency for the cathode exhaust gas to rise, which, in a typical fuel cell configuration, results in the cathode exhaust gas travelling backward (i.e., upward) through the system toward the highest point of the system (i.e., the air inlet). Consequently, ambient air can be drawn in through the outlet of the system (e.g., an exhaust pipe in a vehicle application) by a stack effect. Such ambient air can also travel backward through the system to the fuel cell, exposing the cathode to air.

Thus, there is a need for systems and methods that can minimize such concerns.

SUMMARY

In one respect, embodiments are directed to method of operating a fuel cell system during shutdown. The system has a fuel cell with an anode, a cathode and an ion exchange membrane between the anode and the cathode. A fuel is supplied to the anode, and a fluid (e.g., air) including an oxidizing agent (e.g., oxygen ($O_2$)) is supplied to the cathode along a supply conduit. An electrochemical reaction between the oxidizing agent and fuel occurs in the fuel cell. A cathode exhaust gas is formed in the reaction. The cathode exhaust gas is routed along an exhaust conduit from the fuel cell to an outlet.

According to the method, the fluid is supplied to the cathode substantially at a first pressure. The fluid can be supplied at a low flow rate. The flow of cathode exhaust gases along the exhaust conduit can be substantially restricted while the fluid is supplied to the cathode at a pressure that is greater than the first pressure. In one embodiment, the absolute pressure of the pressure that is greater than the first pressure can be at least about 1.7 bar.

As a result, the pressure of the cathode exhaust gases in the exhaust conduit increases. The voltage of the fuel cell is controlled so as to substantially deplete the oxidizing agent in the fluid supplied to the cathode. Such control can include controlling the voltage of the fuel cell at a substantially constant level. In one embodiment, the substantially constant level can be about 0.8 volts. The pressure of the fluid supplied to the cathode can be decreased to a pressure lower than the pressure of the cathode exhaust gas in the substantially restricted exhaust conduit such that the cathode exhaust gas flows backward through the fuel cell and the supply conduit. In this way, oxidizing agent remaining in the fuel cell and supply conduit is forced out of the system by the backward flowing cathode exhaust gas. As a result, the likelihood of exposing the cathode to an oxidizing agent can be minimized.

In another respect, embodiments are directed to a fuel cell system. The system includes a fuel cell with an anode, a cathode and an ion exchange membrane between the anode and the cathode. The system includes a supply conduit for supplying a fluid (e.g., air) including an oxidizing agent (e.g., oxygen ($O_2$)) to the cathode. The supply conduit has an inlet at one end and is operatively connected to the fuel cell at another end. In this way, the supply conduit is in fluid communication with the cathode.

The system further includes an exhaust conduit. The exhaust conduit is operatively connected to the cathode of the fuel cell and receives cathode exhaust gas from the cathode. The system further includes a branch conduit that operatively connects the supply conduit and the exhaust conduit. The branch conduit permits fluid communication between the supply conduit and the exhaust conduit. A fluid movement device is operatively positioned along the supply conduit. A valve system is operatively positioned to selectively restrict flow along the branch conduit and the exhaust conduit and to selectively restrict flow along the exhaust conduit upstream of an outlet.

Upon shutdown, the system is configured to supply the fluid to the cathode substantially at a first pressure. The system is also configured to substantially restrict the flow of cathode exhaust gases along the exhaust conduit while supplying the fluid to the cathode at a pressure greater than the first pressure such that the pressure of a cathode exhaust gas in the exhaust conduit increases. The system is further configured to control the voltage of the fuel cell so as to substantially deplete the oxidizing agent in the fluid supplied to the cathode. Such control can include controlling the voltage of the fuel cell at a substantially constant level. In one embodiment, the voltage of the fuel cell can be controlled at about 0.8 volts. The system is still further configured to decrease the pressure of the fluid supplied to the cathode to a pressure lower than the pressure of the cathode exhaust gas in the substantially restricted exhaust conduit such that the cathode exhaust gas flows backward through the fuel cell and the supply conduit. In this way, oxidizing agent remaining in the fuel cell and supply conduit can be forced out of the system by the backward flowing cathode exhaust gas.

In still another respect, embodiments are directed to a method of operating a fuel cell system during shutdown. The system has a fuel cell with an anode, a cathode and an ion exchange membrane between the anode and the cathode. A fuel is supplied to the anode, and a fluid including an oxidizing agent is supplied to the cathode along a supply conduit. An electrochemical reaction between the oxidizing agent and fuel takes place in the fuel cell.

According to the method, the fluid is supplied to the cathode. The fluid can be supplied at a low flow rate. The voltage of the fuel cell can be controlled. For instance, the voltage of the fuel cell can be controlled at a substantially constant level, such as at about 0.8 volts. Thus, the oxidizing agent in the fluid supplied to the cathode is substantially depleted. The supply of the fluid to the cathode can be substantially restricted. As a result, the oxidizing agent in in the fuel cell system can be substantially depleted. Thus, concerns of exposure of the cathode to an oxidizing agent after shutdown are minimized.

DETAILED DESCRIPTION

Arrangements described herein relate to systems and methods for protecting a fuel cell system during shutdown. Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of the invention. Arrangements are shown in FIGS. 1-7, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
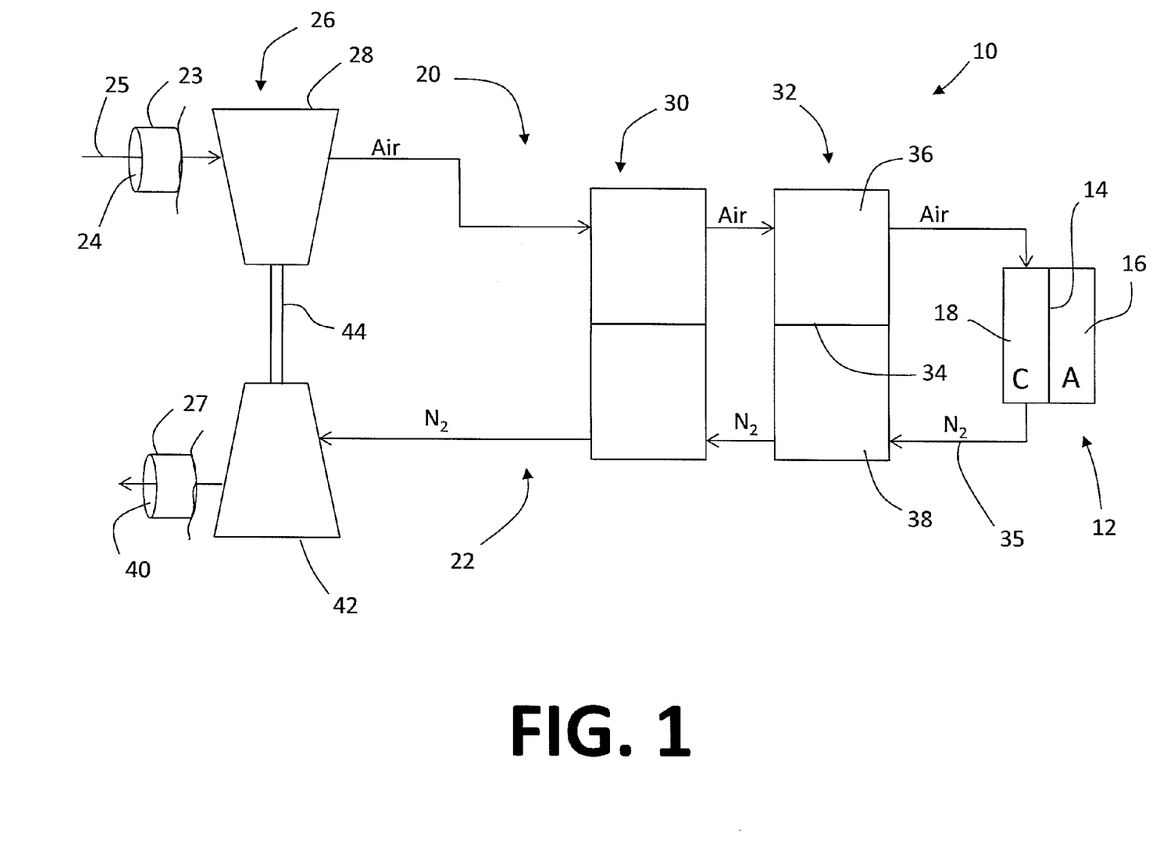
FIG. 1 is an example of a fuel cell system.

Embodiments are directed to a system for protecting a fuel cell system after shutdown by minimizing the retention and/or infiltration of oxidizing agents in the system after shutdown. Referring to FIG. 1, an example of a fuel cell system 10 is shown. The system 10 includes a fuel cell 12. The fuel cell 12 can be any suitable type of fuel cell. The fuel cell 12 can include membrane electrolyte assembly ("MEA") that has an ion exchange membrane 14 disposed between an anode 16 and a cathode 18. A plurality of individual MEAs can be provided to form a fuel cell stack. The following description is applicable to a single fuel cell as well as fuel cell stacks.

The system 10 can provide a supply conduit 20 and an exhaust conduit 22. The supply conduit 20 can include an inlet 24. The supply conduit 20 can be defined by any suitable structure, including, for example, one or more pipes 23, ducts, fittings, fasteners, hoses, and/or components. The supply conduit 20 can be operatively connected to the fuel cell 12. The term "operatively connected," as used herein, can include direct or indirect connections, including connections without direct physical contact. The supply conduit 20 can permit fluid communication between the inlet 24 and the cathode 18 of the fuel cell 12. One or more filters (not shown) can be provided along the supply conduit 20, such as at the inlet 24, to minimize the undesired items from the air flow 25 in the supply conduit 20.

In some instances, one or more components can be disposed along the supply conduit 20 between the inlet 24 and the fuel cell 12. Such components can be connected to neighboring components, the fuel cell 12 and/or the inlet 24 by any suitable conduit, such as one or more pipes, ducts, fittings, fasteners, hoses, and/or components.

As an example, the system 10 can include a fluid movement device 26, which can move air or other fluid inducted in the inlet 24 of the system 10 toward the cathode 18 of the fuel cell 12. The fluid movement device 26 can be any suitable device, including, for example, a compressor 28, a fan, or a blower, just to name a few possibilities. The fluid movement device 26 can be operatively positioned in any suitable location in the system 10. In one embodiment, the fluid movement device 26 can be located upstream of the fuel cell 12, as is shown in FIG. 1. However, in some instances, the fluid movement device 26 may be located downstream of the fuel cell 12 (e.g., along the exhaust conduit 22), and can draw air inducted at the inlet 24 through the fuel cell 12 and toward the device 26.

The system 10 can include a charge air cooler 30. The charge air cooler 30 can be any suitable device for reducing the temperature of the air 25 in the supply conduit 20 in any manner. In some embodiments, the system 10 may not include a charge air cooler 30.

The system 10 can include a humidifier 32. The humidifier 32 can be any suitable device for increasing the humidity of the air flow 25 in the supply conduit 20. The humidifier 32 can operate by any suitable humidity increasing mechanism. The humidity content of the air 25 can be controlled in any suitable manner, such as by providing a bypass conduit (not shown) around the humidifier 32 and/or by using one or more dosing valves (not shown) and/or by a controlled mister device, just to name a few possibilities. In some embodiments, the system 10 may not include a humidifier.

In one embodiment, the humidifier 32 can be configured to include a membrane 34 separating a first compartment 36 and a second compartment 38. The membrane 34 can be selectively permeable to water. In such case, water vapor from the cathode exhaust gas 35 in the exhaust conduit 22 can be recovered and delivered to the air 25 in the supply conduit 20 via the membrane 34.

The system 10 can include a source (not shown) of a fuel (e.g., hydrogen or a hydrogen-containing mixture). The source can be operatively connected to supply fuel to the anode 16 of the fuel cell 12.

The oxygen ($O_2$) from the air 25 supplied to the cathode 18 and the fuel (e.g. hydrogen) supplied to the anode 16 of the fuel cell 12 can take part in the electrochemical reaction, the details of which are well known. In one type of fuel cell, several events can occur including: dissociation of the hydrogen at the anode 16 into hydrogen ions and electrons; conducting the electrons (electrical current) by means of an external electrical circuit (not shown) to the cathode 18 due to a difference in hydrogen partial pressure between the anode 16 and the cathode 18; passing the hydrogen ions from the anode 16 through the ion exchange membrane 34 to the cathode 18 (the electrochemical hydrogen pump effect); combining the hydrogen ions with the electrons to generate the hydrogen (hydrogen reduction).

After the electrochemical reaction occurs, the products of such reaction in the cathode 18 can include cathode exhaust gas 35. The cathode exhaust gas 35 can include, among other things, depleted air that can primarily comprise nitrogen ($N_2$) and little or no oxygen ($O_2$). The cathode exhaust gas 35 can be directed out of the system 10 via the exhaust conduit 22, which is in fluid communication with the cathode 18 of the fuel cell 12. The exhaust conduit 22 can include an outlet 40. The exhaust conduit 22 can be defined by any suitable structure, including, for example, one or more pipes 27, ducts, fittings, fasteners, hoses, and/or components.

In some instances, one or more components can be disposed along the exhaust conduit 22 between the fuel cell 12 and the outlet 40. Such components can be connected to neighboring components, the fuel cell 12 and/or the outlet 40 in any suitable manner, such as one or more pipes, ducts, fittings, fasteners, hoses, and/or components.

In one embodiment, at least a portion of the cathode exhaust gas 35 can be passed through the humidifier 32. For instance, the cathode exhaust gas 35 can pass through the second compartment 38 of the humidifier 32. Water vapor in the cathode exhaust gas 35 can be extracted from therefrom and delivered via the membrane 34 to the air 25 in the supply conduit 20 as it passes through the first compartment 36 of the humidifier 32. However, in some instances, water recovery may be achieved by a component other than the humidifier 32, such as by a precipitator device (not shown). Alternatively, in some arrangements, a water recovery device may not be provided.

Another component that may be operatively connected along the exhaust conduit 22 is the charge air cooler 30. However, in some instances, the system 10 may not include a charge air cooler 30 or the cathode exhaust gases 35 in the exhaust conduit 22 may not pass through the charge air cooler 30.

In some instances, a turbine 42 can be operatively connected along the exhaust conduit 22 upstream of the outlet 40. In some instances, the turbine 42 can be operatively connected to the compressor 28. For instance, a compressor wheel (not shown) of the compressor 28 and a turbine wheel (not shown) of the turbine 42 can be coupled to opposite ends of a common shaft 44. The turbine 42 can be used at least in part to power the compressor 28. The turbine 42 can also function to lower the pressure of the flow of the cathode exhaust gases 35 exiting the outlet 40.

One example of the general operation of such the fuel cell system 10 will now be described. A fluid including an oxidizing agent, such as air 25, can be initially inducted into the compressor 28. The fluid can be received from any suitable source, including ambient air. The compressor 28 can compress the air 25. The compressed air 25 can be routed along the supply conduit 20 to the charge air cooler 30, which can cool the air 25. Next, the cooled air 25 can flow into the humidifier 32, where the humidity content of the air 25 can be increased by, for example, absorbing water vapor from, among other sources, the cathode exhaust gas 35 of the fuel cell 12.

The supply air 25 is then directed into the cathode 18 of the fuel cell 12 and takes part in the electrochemical reaction along with fuel supplied to the anode 16. After reaction, the cathode exhaust gas 35 can be formed and can be supplied to the humidifier 32 where water vapor can be extracted therefrom and delivered to the air 25 in the supply conduit 20 via the membrane 34. Finally, the cathode exhaust gas 35 can pass through the turbine 42 and then discharged to the environment.

Figure 2:
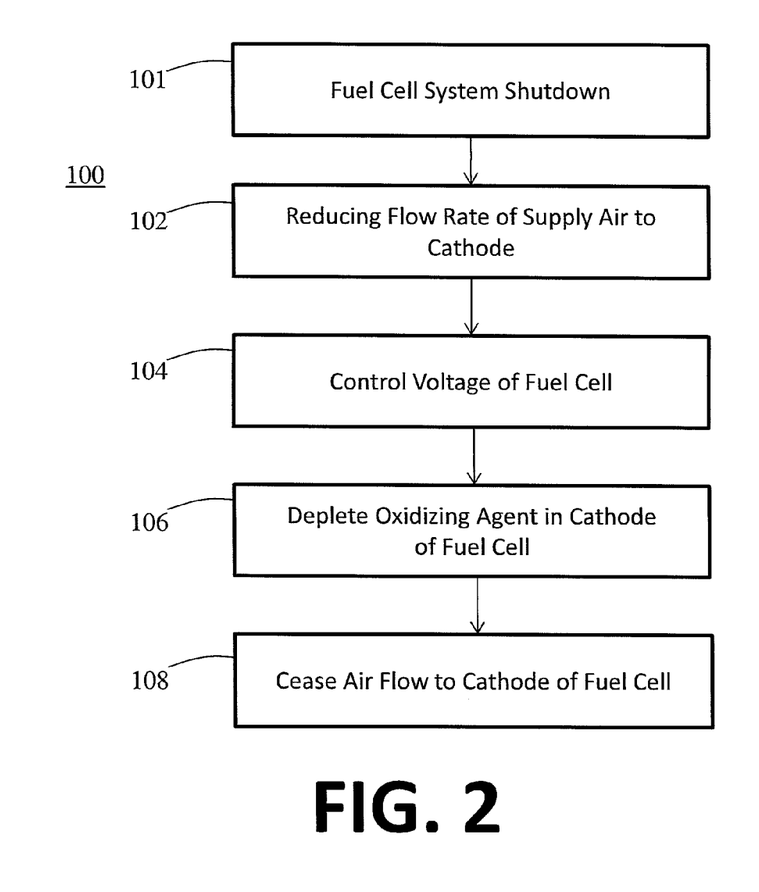
FIG. 2 is an example of a method of operating a fuel cell at shutdown.

The system 10 can be shutdown in a manner so as to reduce the retention of oxygen or other oxidizing agents in the system 10. Referring to FIG. 2, an example of a method 100 of operating the fuel cell system 10 during shutdown is shown. Various possible steps of method 100 will now be described. The method 100 illustrated in FIG. 2 may be applicable to the embodiments described above in relation to FIG. 1, but it is understood that the method can be carried out with other suitable systems and arrangements. Moreover, the method 100 may include other steps that are not shown here, and in fact, the method 100 is not limited to including every step shown in FIG. 2. The steps illustrated in FIG. 2 as part of the method 100 are not limited to the particular chronological order shown, either. Indeed, some of the steps may be performed in a different order than what is shown and/or at least some of the steps shown can occur simultaneously.

System shutdown can be initiated at step 101. As an example, in a vehicle application, shutdown can occur when the key is removed from the ignition. During system shutdown, the flow of air 25 to the cathode 18 of the fuel cell 12 can be reduced at step 102. The flow rate can be reduced in any suitable manner. For instance, a portion of the air 25 can be diverted from the supply conduit 20, such as by using a waste gate along a branch conduit (not shown) such that the portion of air is supplied to the inlet of the turbine 42 or to some other destination. Alternatively or in addition, the flow of air 25 along the supply conduit 20 can be restricted in any suitable manner. Still alternatively or in addition, the flow of air 25 along the supply conduit can be reduced by adjusting the operation of or deactivating the fluid movement device 26. The reduction in flow rate can occur over any suitable period of time.

At step 104, the average voltage of the fuel cell can be controlled to consume the substantial majority of oxygen ($O_2$) from the air 25 being supplied to the fuel cell 12. In one embodiment, the voltage of the fuel cell 12 can be controlled so that it is maintained at a substantially constant level. Any suitable voltage can be selected so as to be sufficiently low to consume the substantial majority of oxygen ($O_2$) from the air 25 being supplied to the fuel cell 12. In one embodiment, the voltage can be maintained at about 0.8 volts. Voltages above or below about 0.8 volts can be selected as well. In another embodiment, the voltage can be maintained at about 0.7 volts. The voltage can be low enough to ensure that oxygen ($O_2$) is substantially depleted from the last volume of air that enters the fuel cell 12. The voltage can be controlled at a substantially constant level, or it can be varied over time. The voltage can be determined at least in part based on how quickly the flow of air 25 to the cathode 18 of the fuel cell 12 decreases.

The voltage can be selected to avoid having all of the oxygen ($O_2$) in the air consumed too quickly, that is, before shutdown of the system is completed. In such case, more energy may be consumed than is actually needed because oxygen ($O_2$) is being removed from air that would already have been exhausted through the outlet 40; consequently, system efficiency is reduced. Further, there can be an increase in hydrogen emissions from the outlet 40 since there is not enough oxygen to bond with the reformed hydrogen in the cathode 18. Exhausting of hydrogen from the outlet 40 can raise safety concerns due to its highly combustible nature. Thus, the voltage can be selected with such considerations in mind. It should be noted that steps 102 and 104 can occur substantially simultaneously.

As the rate of air flow to the cathode 18 decreases and the voltage of the fuel cell 12 is controlled, any oxidizing agent in the cathode 18 or the supply conduit 20 can be eventually substantially depleted at step 106 by the electrochemical reaction in the fuel cell 12. At least a portion of step 106 can occur substantially simultaneously with step 102 and/or step 104. At step 108, the flow of air 25 to the fuel cell 12 can be ceased, that is, reduced to substantially zero. Such cessation of air flow can be achieved in any suitable manner, such as by diverting all air 25 received in the inlet 24 to another location and/or by restricting air flow in any suitable location along the supply conduit 20. It should be noted that steps 104, 106 may continue for a period of time after step 108 is performed.

Operating the fuel cell system 10 in such a manner during shutdown can substantially consume any remaining oxygen in the system 10. Thus, any backflow of cathode exhaust gases 35 through the fuel cell 12 and upstream thereof can be rendered harmless because there is substantially no oxygen present in the cathode exhaust gases 35 which could otherwise damage the MEA.

Figure 3:
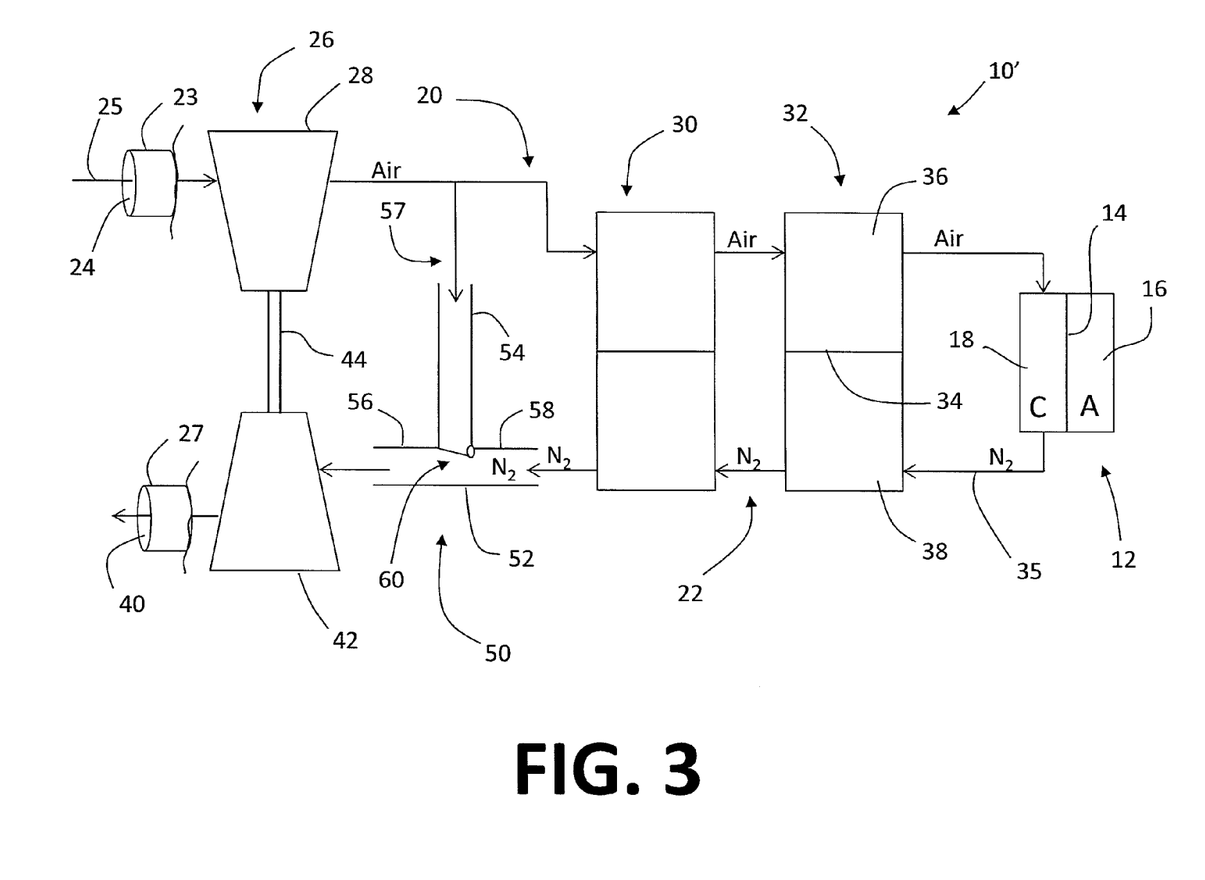
FIG. 3 is an example of a fuel cell system having a three-way valve, wherein the valve is in a first operative configuration.

The system can be further be configured to minimize the infiltration of air into the fuel cell system after shutdown, such as by wind-induced air flow, buoyancy-driven air flow or other air flow generation mechanisms. FIG. 3 shows one example of an alternative implementation of a fuel cell system 10'. The above discussion of the various components of system 10 applies equally to system 10'. Accordingly, the reference numerals are repeated in connection with FIG. 3.

The system 10' can include a valve system 50. In one embodiment, the valve system 50 can include a three way valve 52. The three way valve 52 can be any suitable type of valve. The three way valve 52 can include a first branch 54, a second branch 56 and a third branch 58. The first branch 54 can be operatively connected in branched relation to and in fluid communication with the supply conduit 20. For instance, the first branch 54 can be operatively connected to a branch conduit 57, which is in branched relation to the supply conduit 20 between the compressor 28 and the charge air cooler 30. The second and third branches 56, 58 can be operatively connected along and in fluid communication with the exhaust conduit 22, as is shown in FIG. 3.

The three way valve 52 can include a blocking element 60 for selectively blocking flow between the branches 54, 56, 58. The blocking element 60 can have any suitable form, and embodiments are not limited to the structure shown. The three way valve 52 can include a plurality of operative configurations. For instance, FIG. 3 shows an example in which the three way valve 52 is operatively configured to restrict fluid communication between the first branch 54 and the second and third branches 56, 58. In such case, the valve 52 does not operate as a waste gate and operation of the system may be similar to the operation of the system shown in FIG. 1.

Figure 4:
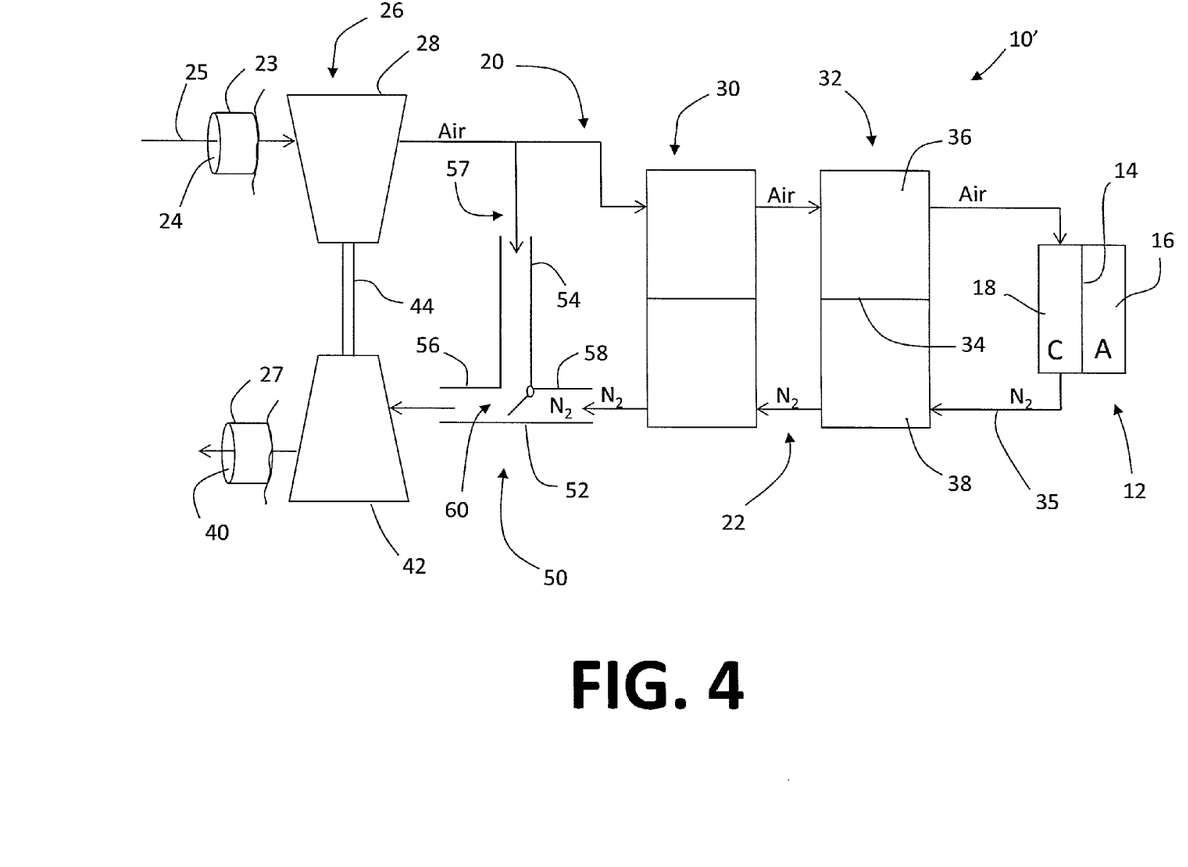
FIG. 4 is an example of a fuel cell system having a three-way valve, showing the valve in a second operative configuration.
Figure 5:
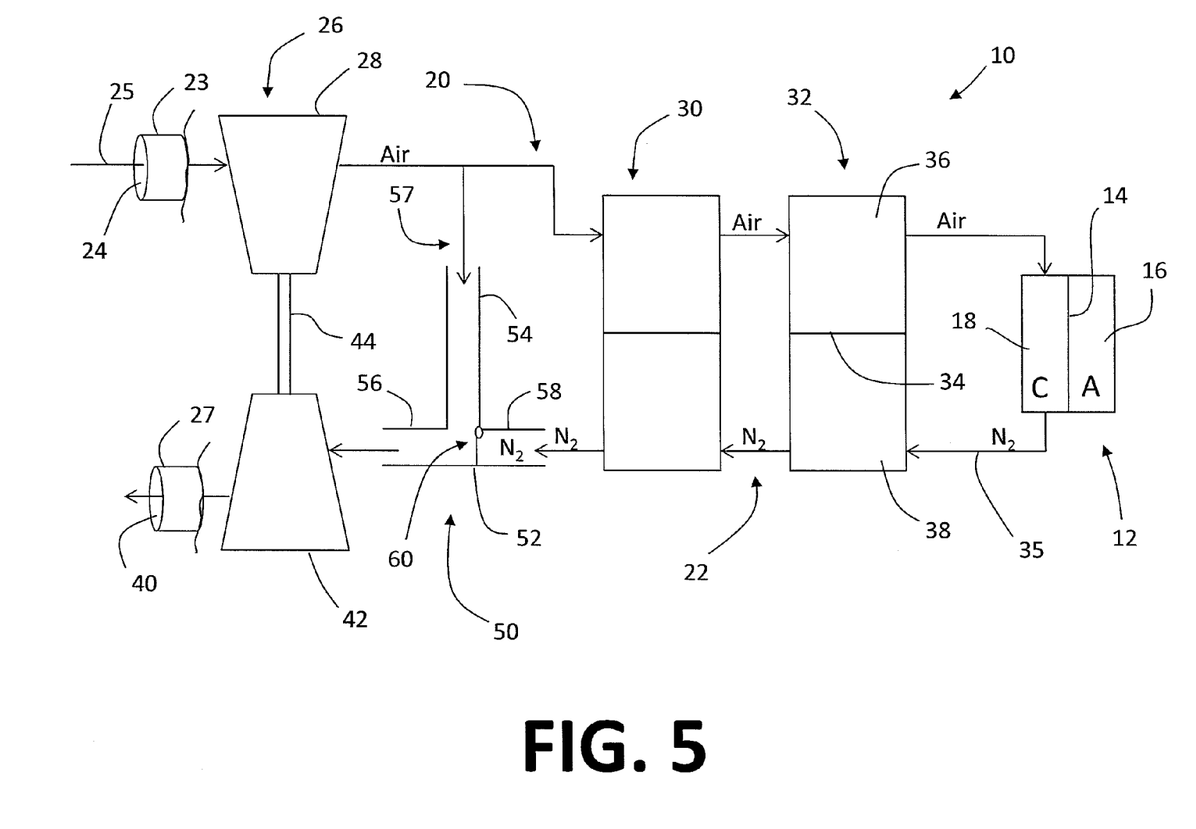
FIG. 5 is an example of a fuel cell system having a three-way valve, showing the valve in a third operative configuration.

FIG. 4 shows an example in which the three way valve 52 is operatively configured in an intermediate position in which fluid communication between all three branches 54, 56, 58 is permitted. FIG. 5 shows an example in which fluid communication is permitted between the first branch 54 and the second branch 56, but fluid communication is restricted between the third branch 58 and the first and second branches 54, 56. In such case, the valve 52 can function as a waste gate. The operative configurations of the three way valve 52 shown in FIGS. 3-5 are provided merely as examples, as additional operative configurations are possible.

A controller (not shown) can be operatively connected to control the flow though the three way valve 52 and to selectively implement the one or more operative configurations of the three way valve 52. The controller can be operated manually or it can be configured to operate automatically responsive to the occurrence of one or more operational conditions using data received from any suitable source. The controller can be comprised of any suitable combination of hardware and/or software.

In an alternative arrangement, the valve system 50 can be comprised of two separate two way valves (not shown). A first two way valve (not shown) can be operatively positioned along the supply conduit 20, such as between the compressor 28 and the charge air cooler 30. A second two way valve (not shown) can be operatively positioned along the exhaust conduit 22, such as between the charge air cooler 30 and the turbine 42. Each of the first and second two way valves can be operatively connected to a controller for selective implementation of one or more operative configurations of the first and second two way valves.

Figure 6:
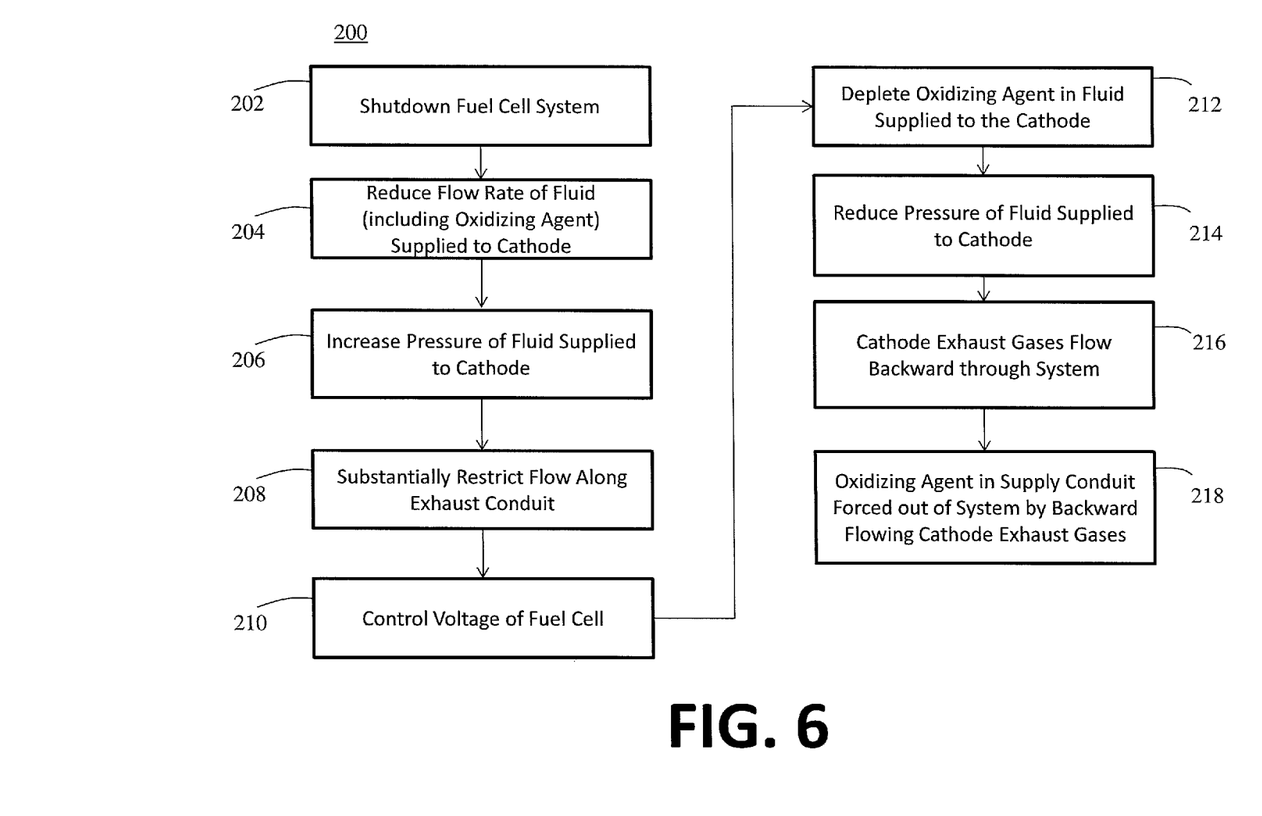
FIG. 6 is an example of a method of operating a fuel cell at shutdown.

According to embodiments herein, the system 10' can be operated during shutdown in a manner so as to reduce the retention of oxygen or other oxidizing agents in the system 10' and to prevent subsequent infiltration of oxygen or other oxidizing agents after shutdown. Referring to FIG. 6, an example of a method 200 of operating the fuel cell system during shutdown is shown. Various possible steps of method 200 will now be described. The method 200 illustrated in FIG. 6 may be applicable to the embodiments described in relation to FIGS. 3-5 and FIG. 7, but it is understood that the method 200 can be carried out with other suitable systems and arrangements, such as a valve system that comprises two separate valves as noted above. Moreover, the method 200 may include other steps that are not shown here, and in fact, the method is not limited to including every step shown in FIG. 6. The steps illustrated in FIG. 6 as part of the method are not limited to the particular chronological order shown, either. Indeed, some of the steps may be performed in a different order than what is shown and/or at least some of the steps shown can occur simultaneously.

System shutdown can be initiated at step 202. At step 204, the flow of air 25 to the cathode 18 of the fuel cell 12 can be reduced. The flow rate can be reduced in any suitable manner. For instance, a portion of the air 25 can be diverted from the supply conduit 20, such as by setting the three way valve 52 to an intermediate position, as shown in FIG. 4. In such position, fluid communication is permitted between the supply conduit 20 and the exhaust conduit 22. With respect to the three way valve 52, fluid communication is permitted between the three branches 54, 56, 58 of the valve 52. Thus, a portion of the air 25 received in the inlet 24 can be routed to the fuel cell 12, and another portion of the air 25 received in the inlet 24 can be diverted by the valve 52 to the turbine 42. In this way, the valve 52 can operate as a waste gate. The reduction in flow rate can occur across any suitable period of time.

At step 206, the pressure of the air 25 in the supply conduit 20 can be increased, if necessary. Such an increase in pressure can be achieved, for example, by adjusting the operation of the fluid movement device 26. The pressure can be increased to any desired level. For instance, the pressure can be increased to a level such that, as will be described below, there is sufficient pressure build up in the exhaust conduit 22 between the fuel cell 12 and the valve 52 such that, when the air adjustment device is deactivated, the built-up pressure is sufficient to purge any air remaining in the cathode 18 and the supply conduit 20 after shutdown. In one embodiment, the fluid movement device can increase the absolute pressure of the air 25 to at least about 1.7 bar. However, other absolute pressure increases above or below this amount may be possible, such as at least about 1.1 bar, at least about 1.2 bar, at least about 1.3 bar, at least about 1.4 bar, at least about 1.5 bar, at least about 1.6 bar, at least about 1.8 bar, at least about 1.9 bar, or at least about 2.0 bar.

At step 208, the flow of cathode exhaust gases 35 along the exhaust conduit 22 can be substantially restricted. At the same time, the reduced flow of air 25 to the fuel cell 12 can continue. As used herein, "substantially restricted" means the exhaust conduit is completely closed or is closed such that only a negligible amount of cathode exhaust gases can pass. The restriction of the exhaust conduit 22 can occur in any suitable location, including upstream of the outlet 40. An example of such a condition is shown in FIG. 5. In such case, the valve 52 can substantially restrict fluid communication between the second and third branches 56, 58 of the valve 52. In addition, fluid communication between the first and third branches 54, 58 can also be substantially restricted.

As a result, an increased portion of air 25 received in the inlet 24 will pass from the outlet of the compressor 28 to the inlet of the turbine 42 through the valve 52. Further, with the exhaust conduit 22 closed, cathode exhaust gases 35 can begin to build up in the exhaust conduit 22 between the fuel cell 12 and the valve 52 since the flow of air 25 to the fuel cell 12 has not been discontinued. Consequently, the pressure of the cathode exhaust gases 35 in this region will increase.

At step 210, the average voltage of the fuel cell 12 can be controlled to consume the substantial majority of oxygen ($O_2$) from the reducing flow rate of air 25 being supplied to the fuel cell 12. In one embodiment, the voltage of the fuel cell can be controlled so that it is maintained at a substantially constant level. Any suitable voltage can be selected so as to be sufficiently low to consume the substantial majority of oxygen ($O_2$) from the air 25 being supplied to the fuel cell 12. In one embodiment, the voltage can be maintained at about 0.8 volts. Voltages above or below about 0.8 volts can be selected as well. In another embodiment, the voltage can be maintained at about 0.7 volts. As noted above in connection with method 100, the voltage can be selected to avoid having all of the oxygen ($O_2$) in the air consumed too rapidly. The voltage can be controlled to ensure that oxygen ($O_2$) is substantially depleted from the last volume of air that enters the fuel cell 12 before the flow reverses (as described below). The voltage can be controlled at a substantially constant level, or it can be varied over time. The voltage can be determined at least in part based on how quickly the flow of air 25 to the cathode 18 of the fuel cell 12 falls to substantially zero.

Figure 7:
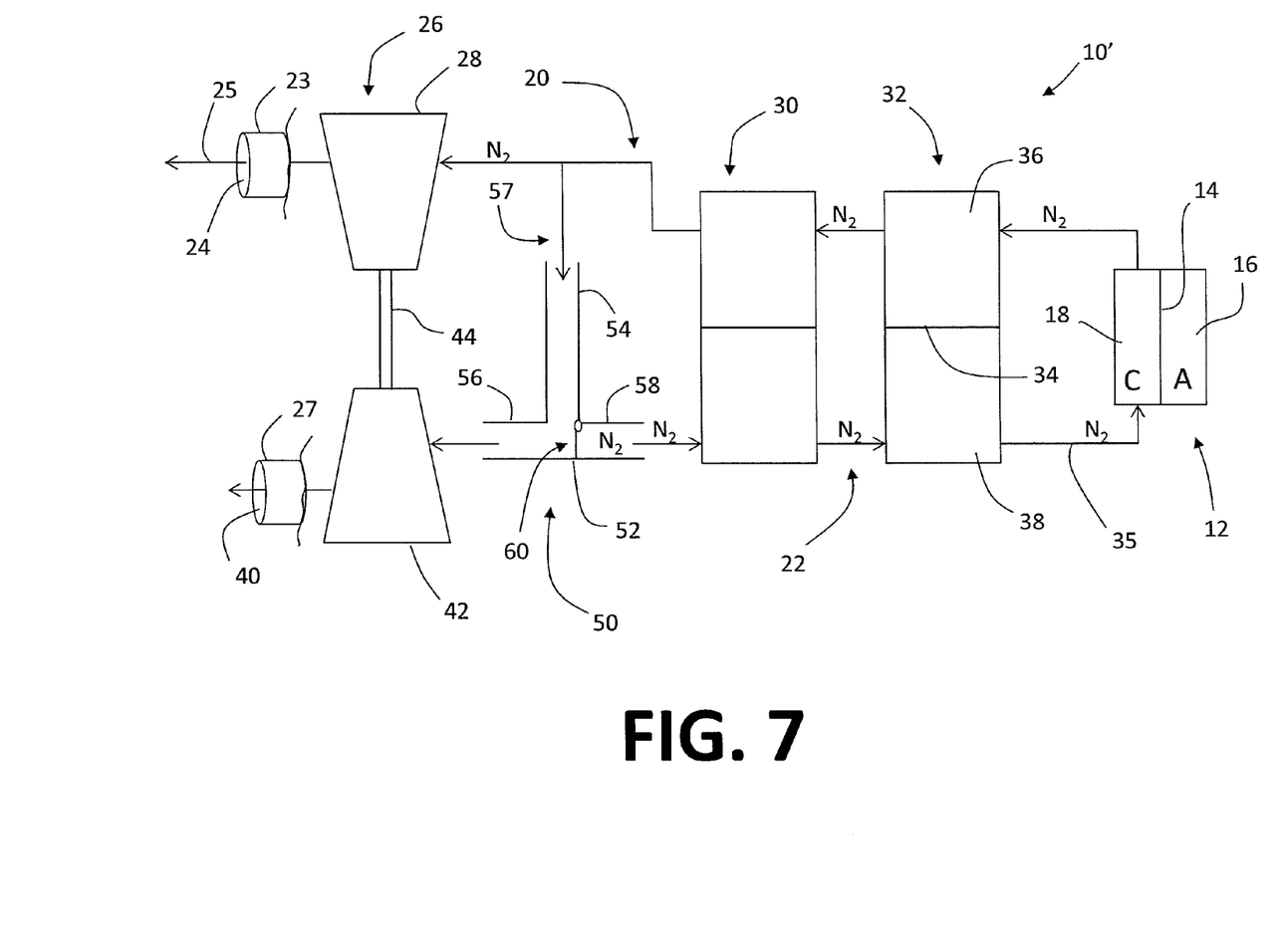
FIG. 7 is an example of a fuel cell system having a three-way valve, showing the cathode exhaust gas flowing backward through the system.

Any oxidizing agent in the cathode 18 and/or the supply conduit 20 can be substantially depleted at step 212 by the electrochemical reaction in the fuel cell 12. At step 214, the pressure of the air 25 supplied to the supply conduit 20 can be reduced. To that end, the fluid movement device 26 can be deactivated. As a result, the pressure of the air 25 in the supply conduit 20 can decrease to substantially atmospheric pressure. However, the cathode exhaust gases 35 in the exhaust conduit 22 and/or in the cathode 18 are at relatively high pressure compared to atmospheric pressure. As a result, at step 218, the cathode exhaust gas 35 can flow backward through the system 10', that is, backward through the fuel cell 12 and, ultimately, out the inlet 24 and, of course, any components in between. An example of such a condition is shown in FIG. 7. In such case, any air in the cathode 18 and/or the supply conduit 20 can be pushed out of the system 10' by the cathode exhaust gas 35. Such backflow of the cathode exhaust gas 35 after shutdown may be harmless to the MEA because the cathode exhaust gas 35 does not contain oxygen that could damage the MEA.

If the following condition is achieved, then the amount of backflow should be sufficient to push at least a substantial portion of the oxygen ($O_2$) out of the fuel cell 12 and/or the supply conduit 20:

$$\left(\frac{P_H}{P_L} - 1\right) * Vd \geq Vs$$

$P_H$ can be the pressure downstream of the fuel cell 12 (e.g., the pressure in the exhaust conduit 22 between the cathode 18 and the valve 52) at the point when the flow through the fuel cell 12 reverses. $P_L$ can be the final pressure downstream of the fuel cell 12 (e.g., the pressure in the exhaust conduit 22 between the cathode 18 and the valve 52). $P_L$ may be atmospheric pressure. $V_d$ can be the volume downstream of the fuel cell 12 (e.g., the volume in the exhaust conduit 22 between the cathode 18 and the valve 52 (i.e., the volume that reaches $P_H$)). $V_s$ can be the volume of the cathode 18 of the fuel cell 12. If the above condition is not achieved, then the amount of back flow may not be sufficient to push at least a substantial portion of the oxygen ($O_2$) out of the cathode 18 and/or the supply conduit 20.

It should be noted that with this configuration, the fuel cell 12 some excess hydrogen ($H_2$) may remain on the anode. However, if such excess hydrogen ($H_2$) ultimately enters the system exhaust, there may nonetheless not be excessive hydrogen ($H_2$) concentrations in the emissions during system re-start because the valve 52 can be opened gradually so that the hydrogen ($H_2$) that passes through it is diluted by the larger flow that passes through the branch line.

It should be noted that systems and methods described herein can provide numerous benefits. For instance, the fuel cell can be protected from degradation that results from being exposed to an oxidizing agent retained in the system during shutdown. Further, the use of blocking valves can also help with minimizing the infiltration of oxidizing agents during shutdown.

It should be noted that fuel cell systems and methods described herein can be used in connection with any suitable application. For instance, the fuel cell system can be used in electric and/or hybrid vehicular applications, such as automobiles, buses, forklifts, motorcycles, bicycles, airplanes, boats and submarines. However, it will be appreciated that embodiments are not limited to vehicular applications. Indeed, systems and methods described herein can be used in connection with non-vehicular applications. Alternatively or in addition, systems and methods described herein can be used in connection with stationary applications, including, for example, commercial, industrial and/or residential primary and backup power generation.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

Aspects described herein can be embodied in other forms and combinations without departing from the spirit or essential attributes thereof. Thus, it will of course be understood that embodiments are not limited to the specific details described herein, which are given by way of example only, and that various modifications and alterations are possible within the scope of the following claims.

The invention claimed is:

1. A method of operating a fuel cell system during shutdown, the system having a fuel cell with an anode, a cathode and an ion exchange membrane between the anode and the cathode, a fuel being supplied to the anode and a fluid including an oxidizing agent being supplied to the cathode along a supply conduit such that an electrochemical reaction between the oxidizing agent and fuel occurs in the fuel cell, a cathode exhaust gas being formed in the reaction, the cathode exhaust gas being routed along an exhaust conduit from the fuel cell to an outlet, the supply conduit and exhaust conduit being interconnected via a three-way valve (52) having a blocking element (60), a first branch (54) connected to a branch conduit (57) branched from the supply conduit (20) downstream from the compressor (28), and second and third branches (56, 58) operatively connected along and in fluid communication with the exhaust conduit, the method comprising:
   a) supplying the fluid to the cathode substantially at a first pressure and first flow rate;
   b) operating said blocking element (60) to substantially restrict the flow of cathode exhaust gases along the exhaust conduit while supplying the fluid to the cathode at a pressure greater than the first pressure such that the pressure of the cathode exhaust gases in the exhaust conduit increases;
   c) controlling the voltage of the fuel cell so as to substantially deplete the oxidizing agent in the fluid supplied to the cathode; and
   d) decreasing the pressure of the fluid supplied to the cathode to a pressure lower than the pressure of the cathode exhaust gas in the substantially restricted exhaust conduit such that the cathode exhaust gas flows backward through the fuel cell and the supply conduit, whereby oxidizing agent remaining in the fuel cell and supply conduit is forced out of the system by the backward flowing cathode exhaust gas.

2. The method of claim 1, wherein the absolute pressure of the pressure greater than the first pressure is at least about 1.7 bar.

3. The method of claim 1, wherein the decreasing step comprises decreasing the pressure of the fluid supplied to the cathode to atmospheric pressure.

4. The method of claim 1, wherein the decreasing step comprises deactivating a fluid movement device disposed along the supply conduit.

5. The method of claim 1, wherein the controlling step comprises controlling the voltage of the fuel cell at a substantially constant level.

6. The method of claim 1, wherein the substantially restricting step is performed by a valve operatively positioned along the exhaust conduit.

7. The method of claim 1, wherein in step b) the supplying of the fluid to the cathode at a pressure greater than the first pressure is at a flow rate lower than the first flow rate.

8. The method of claim 7, wherein the lower flow rate is achieved by diverting a portion of the fluid in the supply conduit to a conduit branching from the supply conduit upstream of the fuel cell.

9. The method of claim 1, wherein the cathode exhaust gas is substantially comprised of nitrogen ($N_2$).

10. The method of claim 1, wherein the fluid is air and the oxidizing agent is oxygen ($O_2$).

* * * * *